Aug. 13, 1957    J. W. TWEEDY    2,802,704
BEARING MOUNT CONSTRUCTION FOR ELECTRIC MOTOR OR THE LIKE
Filed Nov. 4, 1954

INVENTOR.
JAMES W. TWEEDY
BY
James and Franklin
ATTORNEYS.

United States Patent Office 2,802,704
Patented Aug. 13, 1957

2,802,704

BEARING MOUNT CONSTRUCTION FOR ELECTRIC MOTOR OR THE LIKE

James W. Tweedy, Owosso, Mich., assignor to Redmond Company, Inc., Owosso, Mich., a corporation of Michigan Application November 4, 1954, Serial No. 466,787

13 Claims. (Cl. 308—132)

The present invention relates to a novel construction for mounting a bearing in an electric motor or the like and for lubricating that bearing.

In the manufacture of electric motors, and particularly fractional horsepower motors which are manufactured in large numbers, the problem of retaining proper alignment of the bearings for the rotor shaft while at the same time utilizing a construction which will adapt to mass production methods has long plagued the industry. There are a large number of manufacturers selling motors of this type and price competition is very keen, particularly since the major customers for such motors purchase in extremely large quantities, a small differential in cost per unit therefore representing a very substantial differential in the value of a given order.

To properly position the bearings in a motor of this type usually requires the maintenance of very close tolerances in the manufacture of the bearings themselves and in the manufacture of the parts in which the bearings are mounted. This inevitably leads to increased cost of production. The motor end caps in which the bearings are to be mounted must be subjected to precision manufacturing operations which are not only expensive because of the time, equipment and skilled labor involved but also result in a substantial number of rejects, thus additionally increasing the cost of the acceptable units.

As a result the art has turned, wherever possible, to the use of self-aligning bearing structures which do not require accurately machined seats in order to achieve a material saving in cost without any appreciable reduction in operating characteristics. Nevertheless, the mounting of such self-aligning bearings has in the past involved the use of structure which was fairly complicated and which presented appreciable difficulties in production line assembly. The problem has been accentuated by the necessity for providing means for lubricating the bearing, a particularly important factor when it is realized that motors of the type under discussion are often installed in remote locations where they are not readily accessible for maintenance.

According to the present invention a particularly simplified structure is employed for mounting the bearing, retaining it in place without destroying its self-aligning characteristic, and providing for lubrication of the bearing. The number of parts involved is minimized, the assembly of those parts is facilitated, and the resultant motor is exceedingly reliable in operation.

According to the present invention the motor end caps may be stamped from sheet material with a recess formed on the inner face thereof within which the bearing is seated. A plurality of apertures are formed in the end cap around the recess. A retaining ring engages the bearing on the inside of the end cap and has arms which pass through the end cap apertures and extend beyond the outer surface of the end cap. A spring is interposed between the end cap and the ends of the arms, the spring acting in such a direction as to cause the retaining ring to urge the bearing into its seat. To provide for lubrication of the bearing, the bearing is provided with a slot extending from the radially outer to the radially inner surface thereof and a mass of absorbent material capable of retaining a supply of lubricating fluid is engaged with the bearing, a portion of that absorbent material passing through the bearing slot so as to directly lubricate the shaft which enters the bearing. The absorbent material is held in position by means of an auxiliary wall secured to the inner surface of the end cap, that wall also serving as an oil catcher which prevents lubricating fluid splashed from the shaft from contacting the working parts of the motor and which returns such fluid to the mass of absorbent material for reuse. A second auxiliary wall is attached to the outside of the end cap and serves as a cover for the spring and the arms on the retaining ring. All of the parts except for the bearing itself may be fabricated in an inexpensive stamping operation, none of them need be made to conform to particularly close dimensional specifications, and assembly of the parts is a very simple matter.

To the accomplishment of the above, and to such other objects as may hereinafter appear, the present invention relates to the construction of the bearing mount, as defined in the appended claims and as described in this specification, taken together with the accompanying drawings in which:

Figure 1:
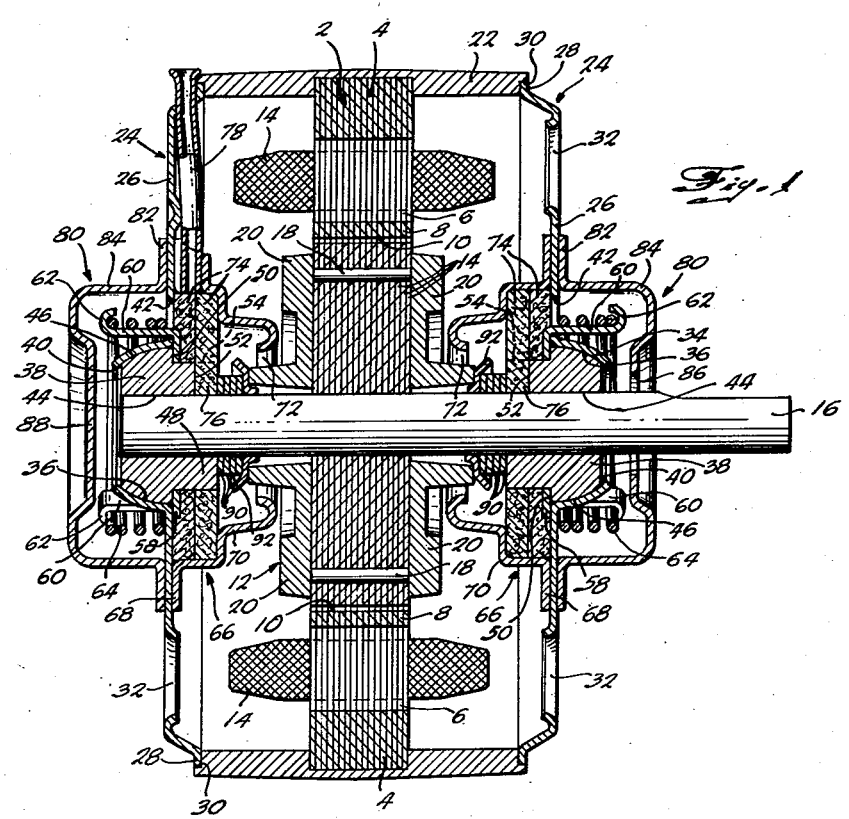
Fig. 1 is a cross sectional view of one embodiment of the present invention.
Figure 2:
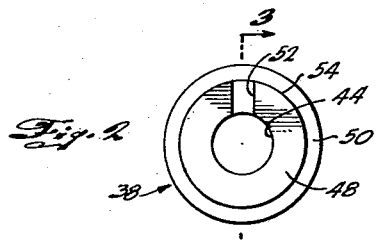
Fig. 2 is a front elevational view of the self-aligning bearing.
Figure 3:
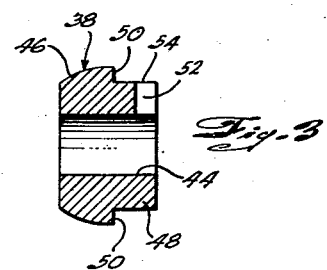
Fig. 3 is a cross sectional view taken along the line 3—3 of Fig. 2.
Figure 4:
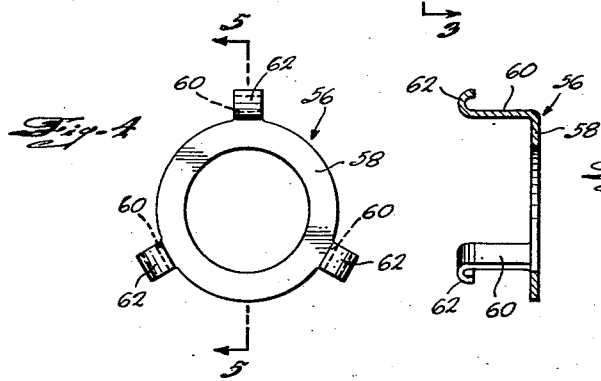
Fig. 4 is a front elevational view of the bearing retainer ring.
Figure 5:
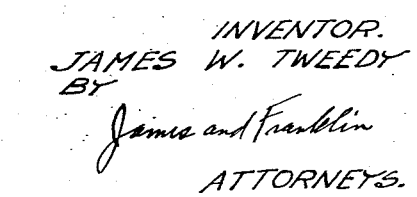
Fig. 5 is a cross sectional view taken along the line 5—5 of Fig. 4.

The motor stator, generally designated 2, comprises a plurality of magnetizable laminations defining an outer ring 4 from which a plurality of poles 6 project radially inwardly and terminate in pole tips 8 having arcuate pole faces 10 within which the rotor generally designated 12 is adapted to rotate, energizing coils 14 being wound around the individual poles 6, all as is conventional. The poles 6 may, if desired, be of the shaded type when, as is here specifically shown, the rotor 12 is of the squirrel-cage induction type, comprising a plurality of laminations 14 mounted on shaft 16 and having conductors 18 passing therethrough and connected at their ends to short circuiting rings 20. The stator laminations are mounted in an outer ring 22 to which the end caps generally designated 24 are secured in any appropriate manner.

As here disclosed the end caps proper 24 are each formed from a single sheet of metal in a conventional stamping and/or drawing operation. They comprise an end wall 26 the tips 28 of which are secured to the stator ring 22, as by being received within recesses 30 formed in the ends thereof. Apertures 32 may be formed in the wall 26 adjacent its ends to facilitate ventilation of the motor.

The central portion of the end plate 24 is struck outwardly at 34 so as to define a concave recess 36 opening onto the inner surface of the end cap 24 and defining a seat for the bearing 38. An aperture 40 is formed at the inner end of the recess 36 in order that the shaft 16 may pass therethrough. While such an aperture need be formed only in that end wall 24 corresponding to the side of the motor from which the shaft 16 projects, it is preferred for reasons of production efficiency that all end caps 24 be uniform, and consequently the aperture 40 is shown in both of the end caps 24 in the motor here specifically disclosed. The wall 26 is further provided with a plurality of apertures 42, here shown as three in number, positioned radially outside the recess 36 and preferably equally angularly spaced around the recess 36.

The bearing 38, formed of any suitable bearing material, has a central bore 44 within which the shaft 16 is adapted to be rotatably received. It is provided with a convexly curved outer surface 46 at one end which is adapted to mate with the inner surface of the recess 36. The bearing 38 is provided with an inner portion 48 of reduced diameter which, when the bearing 38 is seated in the recess 36, projects inwardly beyond the inner surface of the wall 26, a ledge 50 being defined between the bearing portion 48 and the bearing portion which carries the convex surface 46. A slot 52 is formed at the tip of the bearing portion 48, that slot extending between the radially inner and outer surfaces 44 and 54 thereof.

In order to retain the bearing 38 in the seat 36 and still permit it an appreciable degree of freedom of movement so as not to destroy its self-aligning characteristic, a retaining element generally designated 56 is employed, that element comprising a ring-like portion 58 adapted to surround the bearing portion 48 of reduced diameter and engage the bearing ledge 50. A plurality of arms 60, here shown as three in number, extend from the outer periphery of the ring 58 and pass through the apertures 42 in the end plate wall 26, the tips of those arms being provided with outturned hooks 62. A compression spring 64 is engaged between the outer surface of the end cap wall 26 and the hooks 62 on the arms 60, the spring 64 serving to resiliently urge the arms 62 outwardly, thus, through the engagement of the ring-like portion 58 of the retaining element 56 with the ledge 50 on the bearing 38, resiliently urging the bearing 38 into the seat 36.

An internal oil catching ring generally designated 66 is secured to the inner surface of the wall 26 radially outside of the apertures 42. It is defined by a rim 68 attached to the wall 26 in any appropriate manner, as by spot welding, from which an auxiliary wall 70 extends radially and axially inwardly with respect to the motor, terminating in an aperture 72 in registration with the recess 36 through which the rotor shaft 16 passes. The configuration of the wall 70 is such that one or more rings 74 of absorbent material such as felt are retained in position surrounding the bearing portion 48 of reduced diameter. As will be seen from Fig. 1, the absorbent rings 74 are retained in position radially by engaging both the bearing portion 48 and the wall 70, and are retained in position axially by engaging the walls 26 and 70. A tab 76 of absorbent material enters the bearing slot 52 and extends all the way therethrough to the radially inner bearing surface 44. This tab may, if desired, be formed integrally with the inner absorbent ring 74. The absorbent rings 74 and the tab 76 serve to hold a supply of lubricating fluid and to deliver that fluid directly to the outer surface of the shaft 16, thus providing for continued lubrication of the motor over a long period of time. If desired, means may be provided for replenishing the supply of lubricating fluid held by the absorbent rings 74, the left hand side of Fig. 1 showing a tube 78 extending from the outside of the left hand end cap 24 through the auxiliary wall 70 to the absorbent rings 74.

In order to protect the bearing and its retaining structure, cup shaped members generally designated 80 are secured to the outer surface of the end cap wall 26, those cup-shaped members 80 comprising a rim 82 directly secured to the wall 26 radially outside the apertures 42 as by spot welding, an auxiliary wall 84 extending outwardly therefrom and over the retaining arms 60, the spring 64 and the exposed outer end of the bearing 38. The element 80 in that end of the motor from which the rotor shaft 16 projects is provided with an aperture 86 through which the shaft 16 passes. The element 80 at the other end of the motor is provided with an imperforate end wall 88.

From the above it will be aparent that the end structures of the motor here illustrated are extremely simple and inexpensive. The retaining elements 56 and the structures 66 and 80 may all be formed in an extremely simple and inexpensive manner. The parts are identical for both ends of the motor, except for the fact that the element 80 at one end must be provided with an aperture 86. From a production point of view the elements 80 for both sides of the motor may all be uniformly fabricated, after which half of those elements may be provided with the apertures 86, thus greatly minimizing fabrication cost.

The assembly of the end structures is also extremely well adapted to production line operations, particularly in view of the fact that close tolerances need not be attained. The bearing 38 is inserted into the seating recess 36, the retaining element 56 is slipped over the bearing portion 48 of reduced diameter, and the spring 64 is put into place. Thereafter the end structure may be manipulated as desired, the elements 38, 56 and 64 reliably remaining in position. The absorbent rings 74 and tabs 76 are positioned, after which the element 66 is secured to the inner face of the wall 26 as by spot welding. Then the element 80 is similarly secured to the outer surface of the wall 26. The end cap assembly is now ready to be secured to the outer stator ring 22 in conventional manner, the rotor 12 is inserted after one end assembly has been secured in place, and then the other end assembly is secured in place. The nature of the bearings 38 and their cooperation with their seats 36 permits the bearings to shift in accordance with the actual position of the rotor shaft 16, thus compensating for whatever departures from exact dimensioning may be present. The springs 64 active on the retaining element arms 60 permit this self-adjustment while serving to retain the bearings 38 within the seats 36.

When the motor is operating the lubricating fluid in the rings 74 is led directly to the outer surface of the shaft 16 within the bearings 38 by means of the absorbent tabs 76, thus lubricating the rotary bearing surfaces. Thrust of the shaft 16 is taken up by the washers 90 on the shaft 16 which engage the inner surface of the bearings 38 and which also wipe over the absorbent tab 76, thus providing for direct lubrication of the thrust bearing surfaces. An oil slinger 92 is also mounted on the rotor shaft 16 and, in cooperation with the wall 70 of the element 66, serves to return lubricating fluid which might be splashed or centrifugally flung from the shaft 16 back to the absorbent rings 74.

While but a single embodiment of the present invention has been here disclosed, it will be apparent that many variations may be made therein, all within the spirit of the invention as defined in the following claims.

I claim:

1. A bearing mount for an electric motor or the like comprising an end wall having two substantially oppositely oriented faces and a recess on one face thereof and having apertures therethrough radially outside said recess, a bearing receivable in said recess and having an aperture within which a shaft is adapted to rotate, a member operatively engaging said bearing and movable with respect to said end wall, arms on said member movably passing through said end wall apertures and extending outwardly to points beyond and spaced from the other face of said end wall, and resilient means operatively interposed between said end wall and said arms urging said arms outwardly with respect to said end wall, thereby exerting resilient force on said bearing causing it to seat within said recess.

2. A bearing mount for an electric motor or the like comprising an end wall having two substantially oppositely oriented faces and a recess on one face thereof and having apertures therethrough radially outside said recess, a bearing receivable in said recess, having an aperture within which a shaft is adapted to rotate, and having a portion extending out of said recess beyond said face of said end wall, a member surrounding said bearing portion and operatively engaging said bearing and movable with respect to said end wall, arms on said member movably passing through said end wall apertures and extending outwardly to points beyond and spaced from the other face of said end wall, and resilient means operatively interposed between said end wall and said arms and urging said arms outwardly with respect to said end wall, thereby exerting resilient force on said bearing causing it to seat within said recess.

3. A bearing mount for an electric motor or the like comprising an end wall having two substantially oppositely oriented faces with a recess on that face thereof adapted to be directed inwardly toward said motor proper and having apertures therethrough radially outside said recess, a bearing receivable in said recess and having a portion extending out of said recess beyond said face of said end wall, said bearing portion having a slot therethrough extending from the radially outer to the radially inner surface thereof, absorbent material in said slot, extending beyond the radially outer surface thereof and adapted to hold a supply of lubricating fluid, a member surrounding said bearing portion and operatively engaging said bearing, arms on said member movably passing through said end wall apertures and extending outwardly to points beyond the other face of said end wall, and resilient means operatively interposed between said end wall and said arms and urging said arms outwardly with respect to said end wall, thereby exerting resilient force on said bearing causing it to seat within said recess.

4. A bearing mount for an electric motor or the like comprising an end wall having two substantially oppositely oriented faces with a concave bearing seat on one face thereof and having apertures therethrough radially outside said seat, a bearing comprising a seating portion adapted to be received in said end wall seat and having a convex outer surface mating with said seat and a portion of reduced diameter projecting from said seat beyond said face of said end wall, a ledge being defined between said bearing portions, a ring-like member surrounding said bearing portion of reduced diameter, engaging said ledge, and having arms movably passing through said end wall apertures and extending outwardly to points beyond the other face of said end wall, and resilient means operatively interposed between said end wall and said arms and urging said arms outwardly with respect to said end wall, thereby exerting a resilient force on said bearing causing it to seat within said recess.

5. A bearing mount for an electric motor or the like comprising an end wall having two substantially oppositely oriented faces with a concave bearing seat on that face thereof adapted to be directed inwardly toward said motor proper and having apertures therethrough radially outside said seat, a bearing comprising a seating portion adapted to be received in said end wall seat and having a convex outer surface mating with said seat and a portion of reduced diameter projecting from said seat beyond said face of said end wall, a ledge being defined between said bearing portions, said bearing having a slot therethrough extending from the radially outer to the radially inner surface thereof, absorbent material in said slot, extending beyond the radially outer surface thereof and adapted to hold a supply of lubricating fluid, a ring-like member surrounding said bearing portion of reduced diameter, engaging said ledge, and having arms movably passing through said end wall apertures and extending outwardly to points beyond the other face of said end wall, and resilient means operatively interposed between said end wall and said arms and urging said arms outwardly with respect to said end wall, thereby exerting a resilient force on said bearing causing it to seat within said recess.

6. A bearing mount for an electric motor or the like comprising an end wall having two substantially oppositely oriented faces with a concave bearing seat on one face thereof and having apertures therethrough radially outside said seat, a bearing comprising a seating portion adapted to be received in said end wall seat and having a convex outer surface mating with said seat and a portion of reduced diameter projecting from said seat beyond the inner surface of said end wall, a ledge being defined between said bearing portions, a ring-like member surrounding said bearing portion of reduced diameter, engaging said ledge and having arms movably passing through said end wall apertures and extending outwardly to points beyond the other face of said end wall, hooks on the ends of said arms, and resilient means operatively interposed between said end wall and said hooks on said arms and urging said hooks away from said end wall, thereby exerting a resilient force on said bearing causing it to seat within said recess.

7. A bearing mount for an electric motor or the like comprising an end wall having two substantially oppositely oriented faces with a concave bearing seat on that face thereof adapted to be directed inwardly toward said motor proper and having apertures therethrough radially outside said seat, a bearing comprising a seating portion adapted to be received in said end wall seat and having a convex outer surface mating with said seat and a portion of reduced diameter projecting from said seat beyond said face of said end wall, a ledge being defined between said bearing portions, said bearing having a slot therethrough extending from the radially outer to the radially inner surface thereof, absorbent material in said slot, extending beyond the radially outer surface thereof adapted to hold a supply of lubricatnig fluid, a ring-like member surrounding said bearing portion of reduced diameter, engaging said ledge, and having arms movably passing through said end wall apertures and extending outwardly to points beyond the other face of said end wall, hooks on the ends of said arms, and resilient means operatively interposed between said end wall and said hooks on said arms and urging said hooks away from said end wall, thereby exerting a resilient force on said bearing causing it to seat within said recess.

8. A bearing mount for an electric motor or the like comprising an end well having two substantially oppositely oriented faces with a recess on that face thereof adapted to be directed inwardly toward said motor proper and having apertures radially outside said recess, an auxiliary wall extending radially outside said apertures, the axially inner portion of said auxiliary wall having an aperture registering with said end wall recess, a bearing receivable in said recess and having a portion extending from said recess axially inwardly beyond said face of said end wall, said bearing having a slot therethrough extending from the radially outer to the radially inner surfaces thereof, absorbent material retained in place between and engaging said bearing and said auxiliary wall and also entering said slot and extending to the radially inner surface of said bearing, said absorbent material being adapted to hold a supply of lubricating fluid, a member surrounding said bearing portion and operatively engaging said bearing, arms on said member movably passing through said end wall apertures and extending outwardly to points beyond the other face of said end wall, and resilient means operatively interposed between said end wall and said arms and urging said arms outwardly with respect to said end wall, thereby exerting resilient force on said bearing causing it to seat within said recess.

9. In the bearing mount of claim 8, a second auxiliary wall secured to said end wall, extending axially outwardly therefrom and surrounding said resilient means and the arms on said member.

10. A bearing mount for an electric motor or the like comprising an end wall having two substantially oppositely oriented faces with a concave bearing seat on that face thereof adapted to be directed inwardly toward said motor proper and having apertures radially outside said seat, an auxiliary wall extending radially and axially inwardly from said end wall from points radially outside said apertures, the axially inner portion of said auxiliary wall having an aperture registering with said end wall recess, a bearing comprising a seating portion adapted to be received in said end wall seat, said seating portion having a convex outer surface mating with said seat, said bearing further comprising a portion of reduced diameter projecting from said seat beyond said face of said end wall, a ledge being defined between said bearing portions, said bearing portion of reduced diameter having a slot therethrough extending from the radially outer to the radially inner surfaces thereof, absorbent material retained in place between and engaging said bearing and said auxiliary wall and also entering said slot and extending to the radially inner surface of said bearing, said absorbent material being adapted to hold a supply of lubricating fluid, a ring-like member surrounding said bearing portion of reduced diameter, engaging said ledge, and having arms movably passing through said end wall apertures and extending outwardly to points beyond the other face of said end wall, and resilient means operatively interposed between said end wall and said arms and urging said arms outwardly with respect to said end wall, thereby exerting a resilient force on said bearing causing it to seat within said recess.

11. In the bearing mount of claim 10, a second auxiliary wall secured to said end wall, extending axially outwardly therefrom and surrounding said resilient means and the arms on said member.

12. A bearing mount for an electric motor or the like comprising an end wall having two substantially oppositely oriented faces with a concave bearing seat on that face thereof adapted to be directed inwardly toward said motor proper and having apertures radially outside said seat, an auxiliary wall extending radially and axially inwardly from said end wall from points radially outside said apertures, the axially inner portion of said auxiliary wall having an aperture registering with said end wall recess, a bearing comprising a seating portion adapted to be received in said end wall seat, said seating portion having a convex outer surface mating with said seat, said bearing further comprising a portion of reduced diameter projecting from said seat beyond said face of said end wall, a ledge being defined between said bearing portions, said bearing portion of reduced diameter having a slot therethrough extending from the radially outer to the radially inner surfaces thereof, absorbent material retained in place between and engaging said bearing and said auxiliary wall and also entering said slot and extending to the radially inner surface of said bearing, said absorbent material being adapted to hold a supply of lubricating fluid, a ring-like member surrounding said bearing portion of reduced diameter, engaging said ledge, and having arms movably passing through said end wall apertures and extending outwardly to points beyond the other face of said end wall, hooks on the ends of said arms and resilient means operatively interposed between said end wall and said hooks on said arms and urging said hooks away from said end wall, thereby exerting a resilient force on said bearing causing it to seat within said recess.

13. In the bearing mount of claim 12, a second auxiliary wall secured to said end wall, extending axially outwardly therefrom and surrounding said resilient means and the arms on said member.

References Cited in the file of this patent
UNITED STATES PATENTS

| | | |
|---|---|---|
| 1,824,304 | Scofield | Sept. 22, 1931 |
| 2,011,493 | Larsh | Aug. 13, 1935 |